(12) United States Patent
Liebig

(10) Patent No.: US 6,810,675 B2
(45) Date of Patent: Nov. 2, 2004

(54) METHOD FOR OPERATING A COMBINED-CYCLE POWER STATION

(75) Inventor: Erhard Liebig, Laufenburg (DE)

(73) Assignee: Alstom Technology LTD, Baden (CH)

( * ) Notice: Subject to any disclaimer, the term of this patent is extended or adjusted under 35 U.S.C. 154(b) by 0 days.

(21) Appl. No.: 10/670,307

(22) Filed: Sep. 26, 2003

(65) Prior Publication Data

US 2004/0060299 A1 Apr. 1, 2004

Related U.S. Application Data

(63) Continuation of application No. PCT/IB02/00851, filed on Mar. 21, 2002.

(30) Foreign Application Priority Data

Mar. 27, 2001 (DE) .......................................... 101 15 131

(51) Int. Cl.$^7$ ............................... F02C 9/00; F02C 6/00
(52) U.S. Cl. .......................... 60/773; 60/39.182; 60/793
(58) Field of Search ............................. 60/773, 39.181, 60/39.182, 793

(56) References Cited

U.S. PATENT DOCUMENTS

| | | | |
|---|---|---|---|
| 3,505,811 A | | 4/1970 | Underwood |
| 4,222,229 A | | 9/1980 | Uram |
| 5,461,853 A | * | 10/1995 | Vetterick ...................... 60/783 |
| 5,678,401 A | * | 10/1997 | Kimura .................... 60/39.182 |
| 6,298,655 B1 | * | 10/2001 | Lee et al. ................. 60/39.182 |

FOREIGN PATENT DOCUMENTS

| | | |
|---|---|---|
| EP | 0 967 366 A1 | 12/1999 |
| EP | 1 050 667 A1 | 11/2000 |
| FR | 1 352 876 | 1/1964 |
| WO | 02/077420 | 10/2002 |

OTHER PUBLICATIONS

Search Report from PCT/IB02/00851 (Jul. 12,2002).
Gericke, B., "Kombi–Anlagen fülndustrie under Kommunen—Einfluss der Gasturbine auf den Dampferzeuger", *VGB Kraftwerkstechnik*, vol. 77–11, pp. 912–919 (1997).

* cited by examiner

*Primary Examiner*—Charles G. Freay
(74) *Attorney, Agent, or Firm*—Cermak & Kenealy LLP; Adam J. Cermak

(57) ABSTRACT

In a method for increasing the power output of a combined-cycle power station, comprising at least one gas turbo group, at least one heat recovery steam generator and at least one steam turbo group, with the gas turbo group comprising at least one compressor, at least one combustion chamber and at least one gas turbine, the heat recovery steam generator having at least one pressure stage and the steam turbo group comprising at least one steam turbine, in which combined-cycle power station air is compressed in a compressor, is then supplied as combustion air to a combustion chamber, the hot gas which is produced there is passed to a gas turbine, and the exhaust gas from the gas turbine is used in a heat recovery steam generator to produce steam for a steam turbo group, an immediate and rapid increase in the power output is achieved, and an additional power output from the combined-cycle power station is maintained in safe operating conditions, in that an supplemental firing is arranged to provide additional heating for the exhaust gas from the gas turbine and in that the combustion chamber or the gas turbo group is supplied with more fuel, and the supplemental firing is switched on at the same time, for immediately, rapidly and temporarily increasing the power output of the combined-cycle power station, and in that the power output of the gas turbo group is reduced again to the extent that the additional steam power produced as a result of the supplemental firing is also provided via the steam turbo group as power.

14 Claims, 2 Drawing Sheets

METHOD FOR OPERATING A COMBINED-CYCLE POWER STATION

This application claims priority under 35 U.S.C. §120 to, and is a continuation of, International Application Number PCT/IB02/00851, filed 21 Mar. 2002, which designated the U.S. and was published as WO 02/077420 in German on 3 Oct. 2002. This application also claims priority under 35 U.S.C. §119 to German application number 101 15 131.4, filed 27 Mar. 2000.

TECHNICAL FIELD

The present invention relates to a method for operating a combined-cycle power station. In particular, the invention relates to a method in which primary response and secondary response requirements are satisfied by a combined-cycle power station in a manner which protects the system, via the interaction of the thermal power from the fuel in the gas turbo group and an supplemental firing in the heat recovery steam generator.

PRIOR ART

With the liberalization of the energy markets, the competition is also becoming considerably more intense in the field of electricity supplies. This is leading on the one hand to rapid introduction of modern energy conversion methods, particularly those with very high efficiency. However, efforts are being made to look for more cost-effective options in the field of providing cold and hot reserves, as well. These requirements are satisfied to a major extent by gas turbo groups and combined-cycle power stations.

Gas turbo groups are able to provide comparatively very high power output gradients. This applies not only to cold starting but also to power output increases from any given power output point. Modern gas turbo groups are nowadays able to produce their rated power output from cold in 30 to 40 minutes.

As a result of the liberalization process, the electricity network operators are increasingly demanding primary response characteristics from the electricity generators' power stations. The expression primary response relates to increasing the power output beyond the reported or currently produced actual power output of any given energy generator with a defined power output gradient. For example, the power output should be increased from the actual power output to satisfy a requirement for an approximately 10% greater power output within 10 seconds. This means that, in the event of a drop in the grid frequency (for example 0.5 Hz), the power stations must be able to produce an increase in the power output (for example 10% of the actual power) in a specific time (for example 10 seconds). It should then be possible to maintain this increase in the power output, in the sense of a secondary response, over a period, for example, of 30 minutes or more. The expression secondary response defines the maintenance of an additional power output above an actual power output, that is to say for example operation with an additional power output of, for example, 10% for a time period of, for example, 30 minutes.

The maximum power output gradient which can be achieved, the magnitude of the additional power output as a function of the actual power output currently being produced, and the maximum duration for providing the additional power output are thus of interest for questions relating to the primary response and secondary response. It should be possible to produce an additional power output, with the exception of the maximum power output, from any given load point. Increasing the power output above the rated power output is in this case subject to particularly stringent requirements.

The expression rated power output is in this case identical to the expression maximum continuous power output, that is to say a high power output for which the system is designed for continuous operation. The expression partial load in this case means a power output below the maximum continuous power output, while an overload means a power output above the maximum continuous power output. The term maximum power output will be used in the following text for the maximum output power which can be produced for a restricted time.

Increases in the power output are particularly critical during times at which there is a peak load on the grid system, during which the respective energy generators are already being operated at their maximum continuous power output (rated power output), and an unplanned event occurs at the same time, which necessitates a brief increase in the output power above the maximum continuous power output.

As already mentioned, gas turbo groups are able to produce comparatively very high power output gradients. For this reason, gas turbo groups are in principle suitable for primary response purposes.

However, nowadays, modern gas turbo groups are designed for efficiency reasons such that they operate in a wide upper power output range in the region of the maximum permissible design temperatures for continuous operation at the rated power output (upper process temperature), that is to say they are at their design temperature limit for continuous operation.

In this upper power output range, power output is controlled via the mass flow, by means of variable guide vanes at the compressor inlet. Increases in the power output in this range thus lead to the design temperatures being exceeded when the operating regime for normal operation is departed from, and this has a negative effect on the life, in particular of the components affected in the hot gas path.

However, this also means that any increase in the power output beyond the rated power output can be achieved only by supplying excess fuel to the gas turbo group, with the configuration that is nowadays normally used. This has the disadvantage that this method of operation as a departure from the normal regime results in the gas turbo group using up a very large number of equivalent operating hours (EOH=equivalent operating hours, OH=operating hours) and losing a very large number of operating life hours (for example 1.3 EOH/OH for steam injection or 1.5 EOH/OH for frequency response). This is particularly true when the overload has to be maintained for a long time.

A further critical situation can occur when the power output is increased rapidly with the power output subsequently being maintained through a secondary response time period during starting of the gas turbo group from cold. Particularly in the case of a cold start, the stabilization processes which are required for technical reasons at specific power output levels may make it necessary to provide holding points at which the power output is kept essentially constant. In the event of a sudden power output demand at the instant before or during such a holding point, it may become necessary to pass through these holding points, and to exceed the maximum permissible power output and temperature gradients, etc.

DESCRIPTION OF THE INVENTION

The invention is accordingly based on the object of providing a method for immediately, rapidly and temporarily increasing the power output of a combined-cycle power station.

In this context, the expression "immediately" should be understood as meaning that the increase in the power output starts to become effective essentially without any delay after being demanded from the combined-cycle power station generators by the electricity marketing organization. "Rapidly" in this context should be understood as meaning that the power input is increased in a short time, that is to say that a high positive power output gradient can be produced. "Temporarily" should in this case be understood as meaning that the additional power output is not decreased again immediately after being built up to the required maximum, but is kept essentially constant for a certain period of time before being reduced.

In this case, this relates to a combined-cycle power station having at least one gas turbo group, at least one heat recovery steam generator and at least one steam turbo group, with the gas turbo group comprising at least one compressor, at least one combustion chamber and at least one gas turbine. The heat recovery steam generator has at least one pressure stage, and the steam turbo group has at least one steam turbine.

In a combined-cycle power station such as this, air is compressed in a compressor, is then passed as combustion air to a combustion chamber, the hot gas which is produced there is passed to a gas turbine, and the exhaust gas from the gas turbine is used in a heat recovery steam generator to produce steam for a steam turbo group. The method is intended to make it possible to achieve rapid power output gradients as required on the grid system side, and to maintain the increased power output for a certain period of time.

This object is achieved in that an supplemental firing is provided for additional heating of the exhaust gas from the gas turbine, and in that the gas turbo group is supplied with more fuel in order to increase the power output, and the supplemental firing is switched on at the same time, for immediately, rapidly and temporarily increasing the power output of the combined-cycle power station, and in that the power output of the gas turbo group is reduced again to the extent that the additional steam power produced as a result of the supplemental firing is available via the steam turbo group as shaft power.

The essence of the invention is thus to use an supplemental firing to provide additional power. However, since this additional power is built up comparatively slowly due to the thermal inertia of the water/steam circuit, and is thus available only with a delay at the steam turbine end, or at the generator end if appropriate, the gas turbo group, which is suitable for such rapid increases in power output (primary response), is used first of all for the immediate and rapid rise in power output, and for the first phase of producing the increased power output. The additional supply of fuel to the gas turbo group can be reduced again to the extent that the additional power output which is provided by the supplemental firing and the steam turbo group also builds up in an effectively useful manner at the generator, thus protecting the gas turbo group. This means that the secondary response time period is essentially supported by the supplemental firing and by the steam turbo group.

A first embodiment of the method according to the invention is distinguished in that the temporary increase in the power output of the combined-cycle power station is provided solely via the supplemental firing and the steam turbo group, and in that the fuel supply to the gas turbo group is reduced to its original level again while the additional power output is being built up via the supplemental firing. This reduction in the output power from the gas turbo group to the original operating point as quickly as possible ensures that the gas turbo group is protected as much as possible, and is overloaded only to the minimum extent.

In a second embodiment of the method, the combined-cycle power station is a system in which the gas turbo group drives an electricity generator, and the combined-cycle power station has a steam turbo group with two or more steam turbines, in particular preferably with a high-pressure steam turbine and a medium-pressure or low-pressure steam turbine. The gas turbo group and the steam turbo group can likewise be arranged on one shaft, and the gas turbo group and the steam turbo group can drive an electricity generator via this common shaft (single shaft system). In this case, the generator may be arranged between the gas turbo group and the steam turbo group, and a coupling or clutch may be located between the steam turbo group and the generator.

In a further embodiment of the invention, the heat recovery steam generator and the steam turbo group are arranged in a closed water/steam circuit.

A further embodiment of the invention relates to an increase in the power output from the combined-cycle power station in the range from 5 to 15%, particularly preferably in the range from 5 to 10%, and this increase in the power output must in this case be built up in a time period of 5 to 30 seconds, particularly preferably in the range from 5 to 10 seconds. The additional power output must be maintained during a further time period in the range from at least 5 to 50 minutes, particularly during a time period of 15 to 30 minutes. The method according to the invention can be used efficiently particularly for power gradients such as these and in times with additional power outputs such as these, without in the process excessively overloading the components of the power station. The reduction in the power output from the gas turbo group to the original power output range can take place in a time period of 10 seconds to 5 minutes, in particular in the range from 30 seconds to 2 minutes.

In this case, the increase in the power output is frequently initiated or required as a result of a drop in the grid frequency in the order of magnitude of 0.1 to 3.0 Hz, particularly from 0.5 to 1.0 Hz.

In a further embodiment of the invention, the gas turbo group is already producing its rated power output before the increase in the power output, and the immediate, rapid and temporary increase in the power output of the gas turbo group is achieved by supplying excessive fuel to the gas turbo group. Particularly when the gas turbo group is being operated at its rated power output, there is a particular problem in increasing the power output. Since a gas turbo group which is being operated at its rated power output is also being operated at its maximum permissible upper temperature limit for continuous operation, any further increase in the power output can be achieved only by supplying excess fuel, which normally causes damage to the entire gas turbo group. Reducing the power output from the gas turbo group as quickly as possible after it has provided the primary response power output is therefore of particular interest in this situation.

In a further preferred embodiment of the proposed method, the supplemental firing is arranged upstream of the heat recovery steam generator and/or within the heat recovery steam generator in the flow direction of the exhaust gas from the gas turbo group. The supplemental firing may likewise be arranged outside the exhaust gas flow from the gas turbo group, and may have a fresh air supply, and the burnt gas from the supplemental firing is mixed with the exhaust gas from the gas turbo group. In this case, the exhaust gas from the gas turbo group can be mixed with the burnt gas from the supplemental firing upstream of the heat recovery steam generator and/or within the heat recovery steam generator in the flow direction of the exhaust gas from the gas turbo group.

Further preferred embodiments of the invention are described in the dependent claims.

BRIEF DESCRIPTION OF THE FIGURES

The invention will be explained in more detail in the following text with reference to exemplary embodiments and in conjunction with the figures, in which.

APPROACHES TO IMPLEMENTATION OF THE INVENTION

Figure 1:
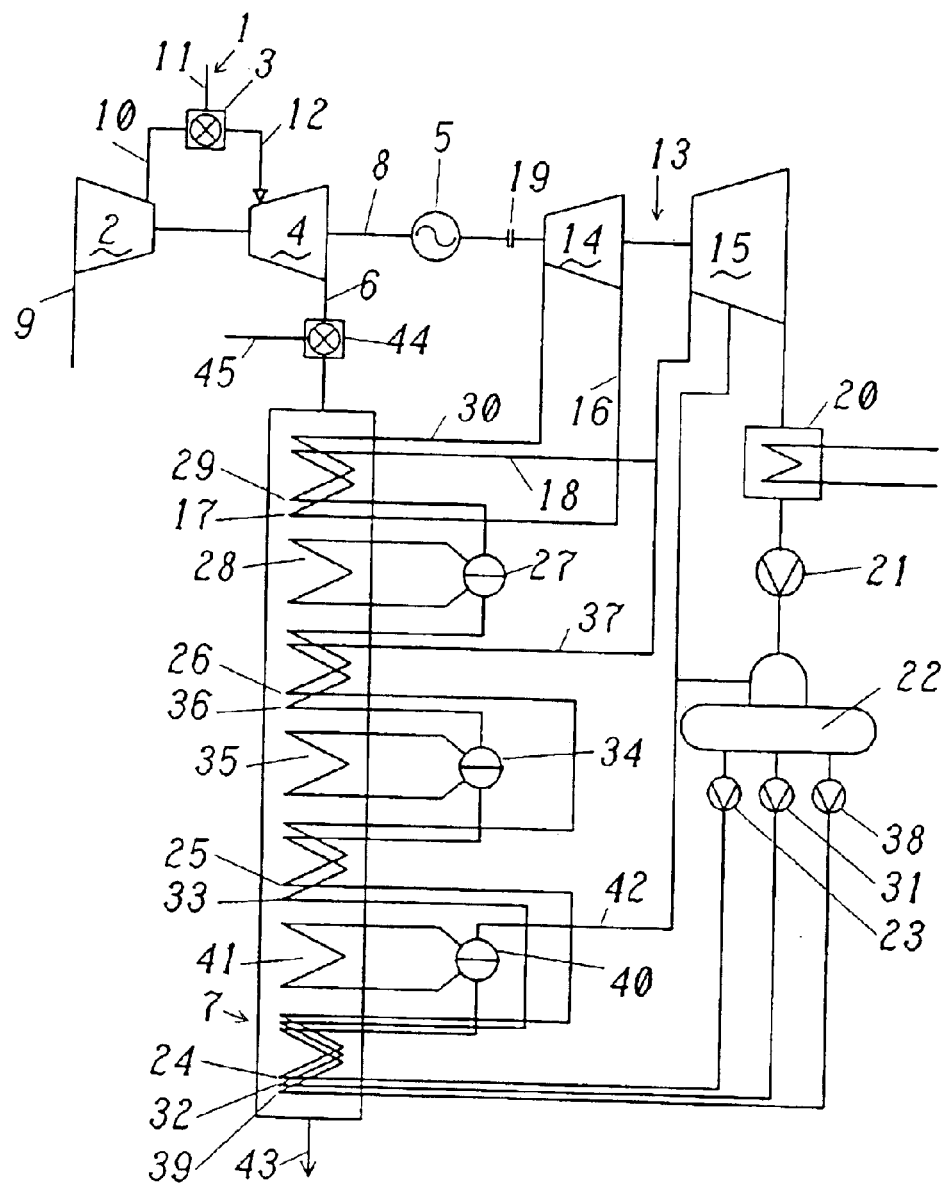
FIG. 1 shows a schematic of a combined-cycle power station.
Figure 1:
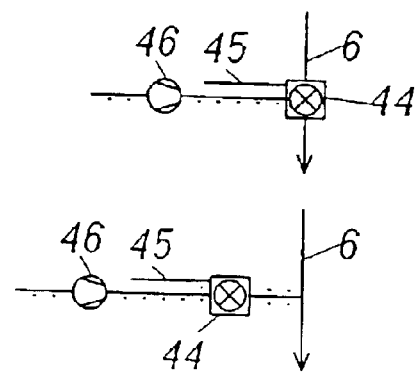

FIG. 1 shows an exemplary embodiment of the method according to the invention in the form of a schematic illustration of a combined-cycle power station with a single-shaft system. The water/steam circuit together with the heat recovery steam generator 7 and the steam turbo group 13 are, by way of example, in the form of a three-pressure process with intermediate superheating 17.

In the following text, the expression combined-cycle power station is used to mean the coupling of a gas process and a steam process in the form of a gas turbo group and a steam turbo group. The heat in the exhaust gases from the gas turbine in the gas turbo group is in this case used to produce steam in a heat recovery steam generator. The steam which is produced is used by means of the steam turbo group to generate electricity.

The combined-cycle power station as shown in FIG. 1 has a gas turbo group 1 whose exhaust gas 6 is supplied to a heat recovery steam generator 7. The gas turbo group 1 comprises a compressor 2, a combustion chamber 3 and a gas turbine 4. The gas turbine 4, the compressor 2 and the generator 5 are arranged on a common shaft 8. The gas turbine 4 drives both the compressor 2 and the generator 5 via this common shaft 8. The gas turbo group 1 and the generator 5 are referred to as a gas turbine set. The air which is supplied to the compressor 2 via an induction air line 9 is passed, after being compressed in the compressor 2, as combustion air 10 to the combustion chamber 3. Fuel which is supplied via the fuel line 11 is burnt in the combustion chamber 3. The hot gas 12 which is produced in the combustion chamber 3 is passed to the gas turbine 4, where it is expanded, producing work.

A gas turbo group may also have two or more combustion chambers and two or more gas turbines. For example, in gas turbo groups with sequential combustion, a high-pressure combustion chamber with a high-pressure turbine is followed by a low-pressure combustion chamber with a low-pressure turbine. A gas turbo group may also have two or more compressors. The gas turbo group could likewise have more than one shaft.

The steam which is produced in two or more pressure stages in the heat recovery steam generator 7 is supplied via the respective fresh steam lines 30, 37, 42 to a steam turbo group 13. After being processed in the high-pressure steam turbine 14 in the steam turbo group 13, the high-pressure steam is supplied via the cold intermediate superheater steam line 16 to the intermediate superheater 17 for the heat recovery steam generator 7, where it is superheated and is supplied via the hot intermediate superheater steam line 18, together with the medium-pressure steam from the medium-pressure/low-pressure steam turbine 15, to the steam turbo group 13.

This steam turbo group 13 comprises a high-pressure steam turbine 14 and a medium-pressure/low-pressure steam turbine 15. In the present case, the steam turbo group 13 likewise drives the generator 5 via a coupling or clutch 19. In situations in which the gas turbo group 1 and the steam turbo group 13 are located on one shaft 8 together with the generator 5, systems such as these are also referred to as single-shaft systems. If the gas turbo group, which comprises the compressor 2, the combustion chamber 3 and the gas turbine 4, and the steam turbo group 13 each have their own generator 5, then this is referred to as a multiple-shaft system. By analogy with a gas turbine set (gas turbo group and generator), a steam turbo group with a generator is also referred to as a steam turbine set. In the case of multiple-shaft systems, more than one gas turbine set with an associated heat recovery steam generator may also be combined with, for example, a steam turbine set.

The steam which is processed in the steam turbo group 13 flows into a condenser 20. Once the exhaust steam has been condensed in the condenser 20, the condensate is passed by the condensate pump 21 to the feed water container/degasser 22, where it is degassed and stored.

Feed water is passed from the feed water container/degasser 22 by means of the high-pressure feed water pump 23 to a high-pressure economizer I 24, after which it flows to the high-pressure economizer II 25, to the high-pressure economizer III 26 and from there to the high-pressure steam drum 27. The high-pressure steam drum 27 is connected to the high-pressure evaporator 28. The high-pressure steam drum 27 is also followed by a high-pressure superheater 29, to which the high-pressure fresh steam line 30 is connected, which leads to the high-pressure steam turbine 14 in the steam turbo group 13.

Feed water is passed from the feed water container/degasser 22 by means of the medium-pressure feed water pump 31 to a medium-pressure economizer I 32, after which it flows to the medium-pressure economizer II 33 and from there to the medium-pressure steam drum 34. The medium-pressure steam drum 34 is connected to the medium-pressure evaporator 35. The medium-pressure steam drum 34 is also followed by a medium-pressure superheater 36, to which the medium-pressure fresh steam line 37 is connected, which leads to the medium-pressure/low-pressure steam turbine 15 in the steam turbo group 13.

Feed water is passed from the feed water container/degasser 22 by means of the low-pressure feed water pump 38 to a low-pressure economizer 39, and flows from there to the low-pressure steam drum 40. The low-pressure steam drum 40 is connected to the low-pressure evaporator 41. The low-pressure steam drum 40 is connected to the low-pressure fresh steam line 42, which likewise leads to the steam turbo group 13. The low-pressure steam is likewise used for degassing the condensate in the supply water container/degasser 22.

The high-pressure economizer I 24, the high-pressure economizer II 25, the high-pressure economizer III 26, the high-pressure steam drum 27, the high-pressure evaporator 28 and the high-pressure superheater 29 together form a high-pressure steam system, which operates at a first pressure level.

The medium-pressure economizer I 32, the medium-pressure economizer II 33, the medium-pressure steam drum 34, the medium-pressure evaporator 35 and the medium-pressure superheater 36 together form a medium-pressure steam system, which operates at a second pressure level.

The low-pressure economizer 39, the low-pressure steam drum 40 and the low-pressure evaporator 41 together form a low-pressure steam system, which operates at a third pressure level.

A heat recovery steam generator comprising circulating drum evaporators has been described above. The feed water which has been preheated by the economizers in the respective pressure levels is thus passed to the steam drum. The drum water is circulated in the steam drum/evaporator system, and some of it is vaporized in the process. The water and steam are separated in the steam drum. The water is once again supplied to the evaporator while the steam is passed directly, or possibly via a superheater which be present, to the steam turbo group.

After flowing through the heat recovery steam generator 7, the exhaust gas 6 is finally passed via a chimney 43 into the open air.

In the present situation, an supplemental firing 44 with the appropriate fuel line 45 is located directly in the exhaust gas line 6 between the gas turbine 4 and the heat recovery steam generator 7. This supplemental firing 44 can be used to reheat the exhaust gas 6 from the gas turbine 4 if necessary, using the residual oxygen that is present in the exhaust gas 6. Since the supplemental firing 44 is operated only when the gas turbo group 1 is in operation, it initially has no fresh air supply. However, it is also possible to operate the supplemental firing 44 with a fresh air supply 46.

The supplemental firing 44 may, however, also be arranged separately. The burnt gas from the supplemental firing 44 may in this case be added to the exhaust gas 6 from the gas turbine 4 either before it enters the heat recovery steam generator 7 or else at any desired point within the heat recovery steam generator 7. In this case, however, a fresh air supply 46 is required to operate the supplemental firing 44.

In addition to the described exemplary embodiment with an supplemental firing 44 between the gas turbine 4 and the heat recovery steam generator 7, the supplemental firing 44 may also be arranged within the heat recovery steam generator 7, preferably upstream of a respective pressure stage in the flow direction. Two or more supplemental firings may also be arranged upstream of the respective pressure stages. EP 1 050 667, which document is in general an integral component of the present description, thus describes a combined-cycle system in which an supplemental firing is advantageously arranged between the high-pressure superheater and the high-pressure evaporator in the heat recovery steam generator. This has the advantage that the supplemental firing can be operated even when the exhaust gas from the gas turbine is already, for example, at a temperature of more than 550° or 600° C., or that it is possible to produce a higher total power output without exceeding an upper temperature limit value in the heat recovery steam generator which is governed, for example, by the materials that are used.

The configuration of the described water/steam circuit, of the heat recovery steam generator 7, of the gas turbo group 1 and of the steam turbo group 13 should be regarded only as an example since, as is generally known, components and systems such as these may have widely differing configurations. The only important factor for the idea of the invention is that an supplemental firing 44 is located between the gas turbine 4 and the heat recovery steam generator 7, that is to say in the exhaust gas line 6, within the heat recovery steam generator 7 or accompanying the heat recovery steam generator 7.

With regard to controlling the power and the frequency in electricity supply systems, a distinction is drawn between different types of control, in addition to what is referred to as the dead band with primary control and secondary control. Since electrical energy cannot be stored on its way from the generator to the consumer, it is in theory necessary to generate at any given instant precisely as much electrical power as is being consumed. The frequency of the electrical power in this case depends directly on the rotation speed of the generators. If a generation deficit now occurs at any given time, then this deficit is initially covered by the energy contained in the flywheel masses of the rotating machines (turbines, generators). In consequence, the machines are braked, thus further reducing the rotation speed and hence also the frequency. If this trend is not counteracted by suitable power control, this would lead to the collapse of the grid system.

Normally, no control actions are taken within what is referred to as the dead band in the range of minor frequency discrepancies of up to ±0.07–0.1 Hz. Only delayed slow feedback control to compensate for residual discrepancies between generation and consumption is possible within this range.

Larger frequency discrepancies in the range from 0.1 to 3.0 Hz caused by power station failures and fluctuations in the electricity demand are shared by the primary control between the power stations throughout the entire electricity system. The imbalance between generation and demand must be compensated for by controlling the generation process within a few seconds. The primary control is in this case used to stabilize the frequency with as little discrepancy as possible, but at a level which is not the same as the grid system value.

The secondary control, which follows the primary control, has the task of restoring the frequency to the grid system value of, for example, 50 Hz, and of restoring the equilibrium between the electricity generators and consumers.

A distinction is also drawn between a sudden increase and a sudden drop in the grid frequency. In the case of an increase in frequency, for example when large loads are switched off, a rapid reduction in the power of the generator units is demanded. This procedure is also referred to as the high frequency response.

A sudden drop in the grid frequency is of major importance. In a situation such as this, additional power must be produced immediately and quickly, and must also be kept available over a lengthy time period. The expression primary response is used internationally for the phase in which power is provided rapidly, and the expression secondary response is used for the subsequent phase in which the additional power is maintained.

It should be noted that the individual expressions are not always used in the same way throughout the world, and can likewise relate to different frequency bands, time periods, power levels etc.

If an immediate and rapid increase in the power output (primary response) is now required from a combined-cycle power station and is also intended to be maintained over a lengthy period (secondary response) after the rise in the power output, then this results in a number of problems.

First of all, the maximum permissible power output and temperature gradients must be complied with. If this is not possible owing to specific grid requirements or as a result of design, construction and state of the gas turbo group, then this makes it necessary to supply excess fuel to the system in conjunction with a corresponding loss of service life, even during the increase in the power output, irrespective of the actual power output being supplied.

While a system such as this is being run up, what are referred to as holding points may also be specified in order to avoid overloading certain components, at which the power output is not increased any further, but the system waits until a stable state has been established with respect to the pressure, temperature etc. (this is particularly relevant for the steam circuit, for example for the heat recovery steam generator), and in order to avoid critical stress situations for example in thick-walled components (for example boiler drums, steam turbine housings, rotors) owing to the severe dynamic thermal load. A power output demand from the grid system side in the primary response conditions may make it necessary to leave or pass through an intended holding point prematurely, with corresponding negative effects on the life of the system.

As already mentioned, for reasons related to good partial load characteristics, that is to say a high partial load efficiency, modern gas turbo groups are designed such that they are operated at the design temperature over a wide upper power output range. Within this power output range, the power is controlled by controlling the mass flow of the induction air by means of adjustable guide vanes at the compressor inlet in conjunction with controlling the heat produced by the fuel. At the rated power output, the capabilities provided by the air mass flow are exhausted.

Modern combined-cycle power stations are nowadays the power stations that have the highest efficiency. In the area of conventional power stations, they guarantee extremely economic electricity generation. Combined-cycle power stations are thus preferably operated at the rated power output in the medium-load and basic-load range.

The described design and method of operation of a gas turbo group and of a combined-cycle power station mean that:

1. when the power output is increased rapidly in the range below the upper process temperatures, the maximum permissible upper process temperatures may be exceeded for a limited time only for control and accuracy reasons and when leaving the normal operating regime.

2. When the power output is increased rapidly in the region of the upper process temperatures which are already being operated at, the maximum permissible upper process temperatures will necessarily be exceeded on leaving the normal operating regime.

3. The power output can be increased beyond the rated power output, or starting from the rated power output, only by supplying excess fuel to the gas turbo group.

The enormous overloading in particular on the hot gas path that is associated with this means that it is possible or worthwhile to operate a gas turbo group above the rated power output level only for relatively limited times.

Figure 2:
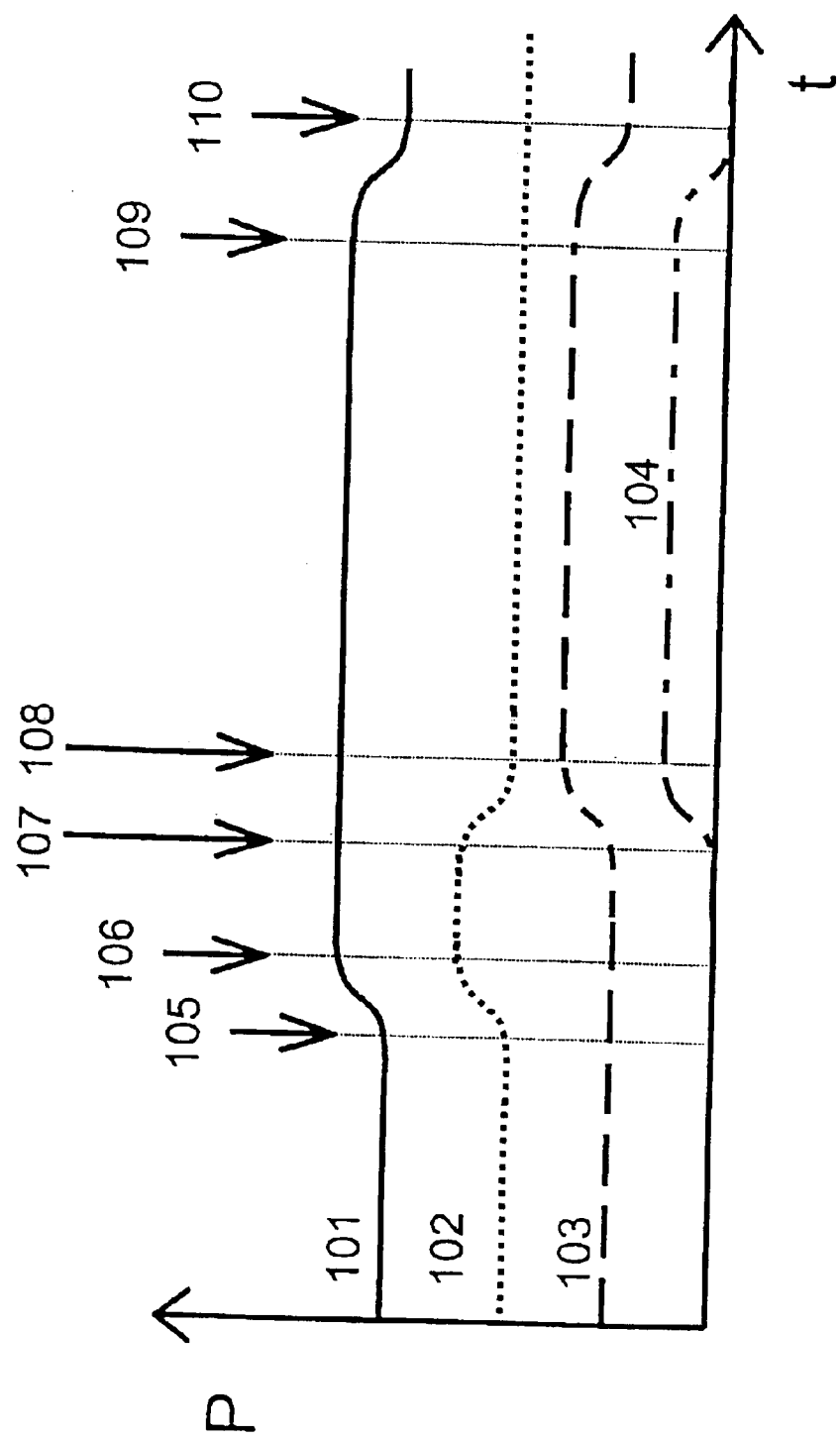
FIG. 2 shows the power station output as a function of time in the event of a power output demand corresponding to the primary and secondary response.

The method as illustrated in FIG. 2 for increasing the power output or for maintaining an additional power output for the primary and secondary response requirements is now used for these reasons. The illustration in this case shows, schematically, the total power output P of the combined-cycle power station 101 as a function of time t. The power station power output is also keyed onto the gas turbo group. 102 and the steam turbo group 103. The supplemental firing 44 for the heat recovery steam generator 7 is initially not operated. The steam generation in the heat recovery steam generator 7 and the power output associated with this from the steam turbo group 13 are determined by the operation of the gas turbo, group 1, and by its exhaust gas heat flow.

An increase in the power output is now generally initiated by a drop in the grid frequency of 0.1 to 3.0 Hz, in particular of 0.5 to 1.0 Hz. In this situation, the grid system operator requires additional power quickly, generally in the range from 5 to 15% of the rated power, particularly in the range from 5 to 10% of the rated power, with respect to the individual combined-cycle power station. The increase in the power output must in this case be built up in a time period of 5 to 0.30 seconds, particularly preferably in a time period of 5 to 10 seconds, (primary response), and it must be maintained (secondary response) during a further time period in the range from 5 to 50 minutes, in particular during a time period of 15 to 30 minutes. These values are different in different countries. One internationally recognized guideline for the requirements of electrical grid systems is the National Grid Code for England and Wales, which many countries throughout the world nowadays use themselves. The stated numerical values are essentially based on this guideline, but take into account the demands of grid system operators throughout the world within their range, that is to say even countries such as Singapore.

The time at which the grid operator calls for additional power in the sense of a primary response is annotated in FIG. 2 as the time at which the additional power demand starts 105. The increase in the power output of the gas turbo group starts at this time, and ends at the time 106 (a time at which the additional power demand is reached).

In principle, it would now be possible to operate the gas turbo group 1, accepting a high load, such that both the primary and secondary response objects can be satisfied. However, it has been found that it is actually not a good idea to maintain the power output in the secondary response phase, in particular in this case in a power output range above the rated power output, owing to the high wear to the gas turbo group 1 that occurs in the process.

However, surprisingly, this can be overcome by the combination with an supplemental firing 44 with a suitable operating profile. As is illustrated in FIG. 2, the power output from the gas turbo group 1 is increased at the time when the additional power demand 105 starts. The additional introduction of power from the gas turbo group 1 is available quickly and covers the primary response phase requirements. The supplemental firing 44 is likewise also operated from the time at which the additional power demand 105 is made. The steam turbine power output also starts to rise as the steam production from the heat recovery steam generator 7 is increased.

Increasing the power output of the gas turbo group 1 also leads, of course, to an increase in the power output of the steam turbo group 13. Since, however, the power output of the steam turbo group 13 is only about 50% of the power output of the gas turbo group 1, this increase in power is not sufficient for a fundamental solution to the secondary response problem, and should therefore not be included in the rest of the analysis, either.

The power output contribution from the supplemental firing 44 is followed with a certain time delay by steam being generated in the heat recovery steam generator 7, followed by the increase in the power output of the steam turbo group 13. The earliest possible time at which the increase in the power output of the steam turbo group 13 can start after starting up the supplemental firing 44 is in the region of 10 seconds. The latest time at which the process of increasing the power output of the steam turbo group 13 can end after starting up the supplemental firing 44 can be expected to be in the range from 2 to 5 minutes.

The power output component from the steam turbo group resulting from the supplemental firing 104 is thus comparatively inert, and would not allow a primary response power output. Now, however, the additional fuel supply to the gas turbo group 1 can be reduced to the extent that the additional power produced by the supplemental firing affects the power output of the system between the times 107 (the time at which the increase in the power output by means of the supplemental firing starts) and 108 (the time at which the additional power demand is provided by means of the supplemental firing). The load on the gas turbo group 1 can thus be reduced to a critical extent. Normally, the gas turbo group 1 can be reduced back to the original fuel-flow state in a time period of 10 seconds to 5 minutes, generally in the range from 30 seconds to 2 minutes. After reducing the power output from the gas turbo group 108 (the time at which the additional power demand is reached by means of the supplemental firing), the additional power output is provided by the supplemental firing 44 in the heat recovery steam generator 7 and by the steam turbo group 13 throughout the entire rest of the secondary response phase. Ideally, the excess fuel supply to the gas turbo group can be reduced before it has been heated to the higher temperature level and critical operating states, etc., occur.

In the course of reducing the load on the power stations which are involved in compensating for the power deficit in the electricity grid, the power output from the supplemental firing 44 can also be reduced again between the times 109 (a time at which the supplemental firing power output is reduced) and 110 (a time at which the steam turbo group output power is reached).

Steam turbo groups can be designed and operated over a wide range of steam mass flows. This means that, with an appropriate absorption capacity, steam turbo groups can process even steam mass flows which are well above the rated steam mass flow, although the efficiency may be reduced. However, it is the power output that is critical rather than the efficiency in the conditions for supplying reserve electrical power.

The water/steam circuit system, in particular the heat recovery steam generator, is a thermally inert system, which is not very suitable for primary response purposes, but is recommended as being suitable for secondary response purposes.

In this way, a combined-cycle power station can be designed to satisfy additional grid requirements by appropriate design and configuration of the heat recovery steam generator and possible derating of the water/steam circuit.

LIST OF REFERENCE SYMBOLS

1 Gas turbo group (comprising 2, 3, 4)
2 Compressor
3 Combustion chamber
4 Gas turbine
5 Generator
6 Exhaust gas, exhaust gas line
7 Heat recovery steam generator
8 (Common) shaft
9 Induction air line
10 Combustion air
11 Fuel line (for the combustion chamber 3)
12 Hot gas
13 Steam turbo group (comprising 14, 15)
14 High-pressure steam turbine
15 Medium-pressure/low-pressure steam turbine
16 Cold intermediate superheater steam line
17 Intermediate superheater
18 Hot intermediate superheater steam line
19 Coupling or clutch
20 Condenser
21 Condensate pump
22 Feed water container/degasser
23 High-pressure feed water pump
24 High-pressure economizer I
25 High-pressure economizer II
26 High-pressure economizer III
27 High-pressure steam drum
28 High-pressure evaporator
29 High-pressure superheater
30 High-pressure fresh steam line
31 Medium-pressure feed water pump
32 Medium-pressure economizer I
33 Medium-pressure economizer II
34 Medium-pressure-steam drum
35 Medium-pressure evaporator
36 Medium-pressure superheater
37 Medium-pressure fresh steam line
38 Low-pressure feed water pump
39 Low-pressure economizer
40 Low-pressure steam drum
41 Low-pressure evaporator
42 Low-pressure fresh steam line
43 Chimney
44 Supplemental firing
45 Fuel line (for the supplemental firing 44)
46 Fresh air supply
101 Total power output (output power) of the combined-cycle power station
102 Power component from the gas turbo group (output power)
103 Power component from the steam turbo group (output power)
104 Power component from the steam turbo group by means of supplemental firing
105 Time at which the additional power output requirement starts
106 Time at which the additional power output requirement is achieved (by means of the gas turbo group)
107 Time at which the gas turbo group power output is reduced=time at which the increase in the power output by means of the supplemental firing starts
108 Time at which the output power from the gas turbo group is reached=time at which the additional power output requirement is reached by means of supplemental firing
109 Time at which the supplemental firing is reduced
110 Time at which the output power of the combined-cycle power station is reached=time at which the output power from the steam turbo group is reached

What is claimed is:

1. A method for operating a combined-cycle power station, the combined-cycle power station including at least one gas turbo group, at least one heat recovery steam generator, and at least one steam turbo group, with the gas turbo group including at least one compressor, at least one combustion chamber, and at least one gas turbine, the heat recovery steam generator having at least one pressure stage, and the steam turbo group including at least one steam turbine, and a supplemental firing being arranged in the gas turbo group exhaust gas path downstream of the gas turbine, the method comprising:

compressing air in the compressor;
supplying the compressed air to the combustion chamber;
using the compressed air as combustion air thus producing a hot gas;
passing said hot gas through the gas turbine;

passing exhaust gas through the heat recovery steam generator;

producing steam in the heat recovery steam generator;

supplying said steam to the steam turbo group;

immediately, rapidly, and temporarily maintaining an increase in the power output of the combined cycle power station, including:

increasing the firing rate of the gas turbo group, including increasing the fuel supply to the gas turbo group thus increasing the power output of the gas turbo group;

taking the supplemental firing into operation thus increasing the steam production; and subsequently reducing the power output of the gas turbo group to the same extent as the increased steam production becomes available as steam turbo group shaft power.

2. The method as claimed in claim 1, further comprising:

reducing the firing rate of the gas turbo group essentially to an original level such that temporarily maintaining an increase of the power output is solely effected by the supplemental firing.

3. The method as claimed in claim 1, further comprising:

increasing the power output of the combined cycle power station by between 5% and 15% of the combined cycle power station nominal rated power.

4. The method as claimed in claim 3, wherein the power increase is in the range of 5% to 10% of the combined cycle power station nominal rated power.

5. The method as claimed in claim 3, further comprising:

increasing the power within 5 to 30 seconds.

6. The method as claimed in claim 5, wherein the power is increased within less than 10 seconds.

7. The method as claimed in claim 3, wherein the power increase is maintained for between 5 and 50 minutes.

8. The method as claimed in claim 7, wherein the duration of the temporary power increase is between 15 and 30 minutes.

9. The method as claimed in claim 1, further comprising:

reducing the power output of the gas turbo set to an original value within 10 seconds to 5 minutes after the power increase.

10. The method as claimed in claim 1, further comprising:

reducing the power output of the gas turbo set to an original value within 30 seconds to 2 minutes after the power increase.

11. The method as claimed in claim 1, further comprising:

triggering the power increase by a decrease of the grid frequency.

12. The method as claimed in claim 11, wherein the triggering grid frequency decrease is in the range from 0.1 Hz to 3.0 Hz.

13. The method as claimed in claim 11, wherein the triggering grid frequency decrease is in the range from 0.5 Hz to 1.0 Hz.

14. The method as claimed in claim 1, further comprising:

operating the gas turbo group at nominal full load; and effecting the increase of the gas turbo group power output by overfiring the gas turbo group.

* * * * *